United States Patent [19]

Katz et al.

[11] Patent Number: 4,739,322

[45] Date of Patent: * Apr. 19, 1988

[54] MERCHANDISE VERIFICATION AND INFORMATION SYSTEM

[75] Inventors: Ronald A. Katz, Los Angeles, Calif.; Robert N. Goldman, Honolulu, Hi.

[73] Assignee: Light Signatures, Inc., Los Angeles, Calif.

[ * ] Notice: The portion of the term of this patent subsequent to Dec. 10, 2002 has been disclaimed.

[21] Appl. No.: 948,257

[22] Filed: Dec. 31, 1986

Related U.S. Application Data

[63] Continuation of Ser. No. 752,759, Jul. 8, 1985, Pat. No. 4,651,150, which is a continuation of Ser. No. 458,699, Jan. 17, 1983, Pat. No. 4,558,318, which is a continuation-in-part of Ser. No. 276,282, Jun. 22, 1981, Pat. No. 4,423,415, which is a continuation-in-part of Ser. No. 161,838, Jun. 23, 1980, abandoned.

[51] Int. Cl.[4] .................... H04Q 9/00; G06K 5/00
[52] U.S. Cl. .................... 340/825.340; 235/375
[58] Field of Search .............. 340/825.34, 825.35; 235/375, 385, 383, 443, 449; 283/82, 91

[56] References Cited

U.S. PATENT DOCUMENTS

| | | | |
|---|---|---|---|
| 3,637,989 | 1/1972 | Howard et al. | 235/385 |
| 3,665,164 | 5/1972 | Beveridge et al. | 340/825.34 |
| 3,737,631 | 6/1973 | Harris | 235/383 |
| 3,770,941 | 11/1973 | Gechele et al. | 235/383 |
| 3,890,599 | 6/1975 | Simjian | 340/825.34 |
| 4,012,720 | 3/1977 | Call et al. | 235/443 |
| 4,164,320 | 8/1979 | Irazoqui et al. | 235/449 |
| 4,191,376 | 3/1980 | Goldman et al. | 235/385 |
| 4,240,848 | 12/1980 | Barber | 156/64 |
| 4,340,810 | 7/1982 | Glass | 235/375 |
| 4,455,483 | 6/1984 | Schonhuber | 235/375 |
| 4,463,250 | 7/1984 | McNeight et al. | 235/385 |
| 4,476,381 | 10/1984 | Rubin | 235/375 |
| 4,489,318 | 12/1984 | Goldman | 340/825.34 |
| 4,528,588 | 7/1985 | Lofberg | 340/825.34 |
| 4,558,318 | 12/1985 | Katz et al. | 340/825.34 |
| 4,651,150 | 3/1987 | Katz et al. | 340/825.34 |

Primary Examiner—Donald J. Yusko
Attorney, Agent, or Firm—Nilsson, Robbins, Dalgarn, Berliner, Carson & Wurst

[57] ABSTRACT

A system is disclosed for individually tracing units of merchandise with authentication devices or tags as such tags (with merchandise) move through channels of commerce. The total system incorporates a non-counterfeitable authenticator or verification tag which bears a machine-readable identification number and which in one form includes perforated, tear-off sections bearing the identification number and in another form is adhesively integrated with a product package. Operating with the tag, the physical system includes a central processor with a memory means that is addressable by using the tag identification number. A tag reader senses the machine-readable identification number (may also verify the tag) and addresses the memory means for registering information to specifically identify the tag and indicate batch information. As the tag (and unit of merchandise) move to commerce, the memory information is supplemented to provide a history of such movement. In subsequent operations, the memory can then be tested for meaningful information on the merchandise. As one key to using the method to procure significant data, the system incorporates apparatus for testing the content of the memory to manifest the identification of specific tags that are related as a subset of merchandise of interest.

14 Claims, 3 Drawing Sheets

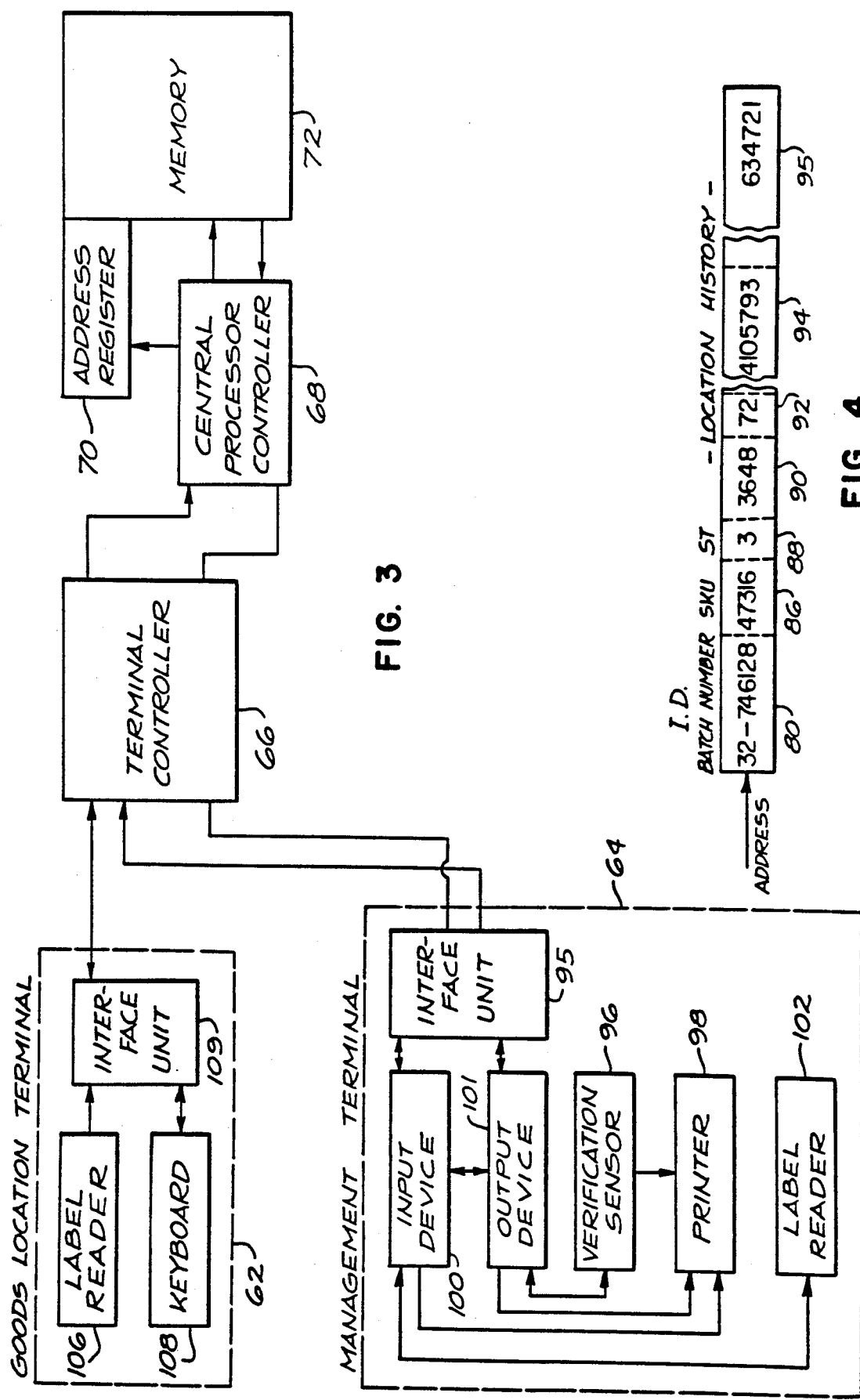

MERCHANDISE VERIFICATION AND INFORMATION SYSTEM

RELATED SUBJECT MATTER

This is a continuation of application Ser. No. 752,759, filed July 8, 1985, now U.S. Pat. No. 4,651,150, which is a continuation of application Ser. No. 458,699, filed Jan. 17, 1983 now U.S. Pat. No. 4,558,318, which is a continuation-in-part of pending application Ser. No. 276,282, filed June 22, 1981, now U.S. Pat. No. 4,423,415 and entitled "Non-Counterfeitable Document System", which is a continuation-in-part of application Ser. No. 161,838 filed June 23, 1980, and abandoned.

BACKGROUND OF THE INVENTION

In recent years, a considerable need has been recognized for anti-counterfeiting devices and systems for use on a variety of articles including trade-identified goods. Problems of lost sales may be compounded by loss of goodwill resulting from inferior counterfeits. Even erroneous product liability exposure may develop in relation to counterfeits. Specific forms of anti-counterfeit devices and systems are disclosed in the parent patent application hereto, Ser. No. 276,282 now U.S. Pat. No. 4,423,415 entitled "Non-Counterfeitable Document System". While such devices and systems have been determined to be quite effective in combatting counterfeit operations, meaningful problems continue to plague merchandisers, which problems are somewhat related to counterfeit operations. Specifically, for example, such problems may develop when anti-counterfeit tags or labels are stolen or otherwise obtained and used to improperly authenticate counterfeit or unauthorized goods.

After an anti-counterfeit device is securely affixed to genuine goods, culpable activities may still present problems in relation to the proper movement of goods through approved channels of commerce. For example, the quantity of goods acknowledged to be received by a retailer may not coincide to the quantity of goods indicated to have been shipped to the retailer by a distributor. Without detailed information, compromise is routine in such situations. Somewhat related problems, as stolen merchandise, tend to occur at various points as units of merchandise move into the channels of commerce. Without positive identification of individual units, tracing missing units is exceedingly difficult if not impossible. Of course, positive identification of goods is important in several other aspects as shelf-life planning and control.

Another grave problem in the distribution of trade identified goods involves unauthorized diversion operations. For example, to maintain certain standards, a manufacturer may establish specific requirements for retail establishments that sell its merchandise. In the face of such provisions, it is not uncommon for an authorized retailer to unload sizable quantities of merchandise, sometimes at a discounted price, to a retailer that does not meet the minimal standards. Again, without the ability to positively identify and trace individual units of merchandise, it is difficult if not impossible to identify the culpable source of the diverted merchandise.

In view of the above considerations, it may be seen that as trademarked or trade identified units of merchandise flow into the channels of commerce, such merchandise is plagued by counterfeits, diversion problems, pilferage, short counts, and a variety of other culpable activities. In addition to a need for a system for combatting such problems, a need exists for a practical system for selectively obtaining data on merchandise at various distribution points, as for use in market and product planning.

The present invention is based upon recognizing the need for a system to provide select detailed information in relation to marketing operations for specific units of merchandise and particularly to enable positive recognition of the units of merchandise that have gone astray. In a broad sense, the present system includes some form of anti-counterfeit verification devices associated with individual units of merchandise. Such "association" may be as a label or tag affixed to a unit of merchandise, or as a package element, or even as part of a unit. Within the system, the devices each bear a unique machine-readable identification number which is machine read, as by an optical code reader, to activate the system to develop and provide data on the merchandise. As disclosed in detail below, the system is organized to interrogate and maintain a memory carrying data on individual products. A logic of subset testing is implemented in the system whereby critical information on individual units may be obtained. The system is effective for obtaining data on merchandise of concern (stolen, lost, and so on) rather than accounting for merchandise of little concern that is properly moving through channels of commerce.

The invention hereof is briefly summarized as a system using a tag for auditing the movement of individual units of merchandise in commerce. Each tag is associated with a specific unit of merchandise and is imprinted to indicate a specific identification for the unit of merchandise and the batch or set of units to which the individual unit of merchandise belongs. As the unit of merchandise moves into commerce (normally along with others), its movement is designated as with respect to locations and customers. Such information is stored in a memory. The historical movement of the unit may then be traced by addressing the memory with specific logic combinations, e.g. "identify all units of a specified batch set shipped to a specific location". Thus, logic combinations of batch set data, locations, customers and so on enables selective tracing of individual units of merchandise that may be of particular concern.

As disclosed in detail below, the physical system and method hereof may be variously implemented using different forms of verification devices and apparatus. For example, verification devices may comprise a wide variety of sheet materials embodying different formats and variously attached to units of merchandise; or such devices may comprise part of an actual unit of merchandise or its package. Various forms of optical readers or sensors can be used to read or sense identifications. Furthermore, a wide variety of coding formats may be utilized for identifying the goods, authenticating the goods, and tracing the goods. Also, depending on specific merchandising problems, various logic systems can be implemented to perform the set-theory operations in obtaining the selectively meaningful data of a subset of merchandise units.

BRIEF DESCRIPTION OF THE DRAWINGS

In the drawings, which constitute a part of this specification, exemplary embodiments of the invention are set forth as follows:

FIG. 3 is a more detailed block diagram of a system constructed in accordance with the present invention;

FIG. 4 is a graphic representation illustrating one form of memory cell organization in the system of FIG. 3;

DESCRIPTION OF THE ILLUSTRATIVE EMBODIMENTS

As indicated above, detailed illustrative embodiments of the present invention are disclosed herein. However, authentication tags, physical identification media, data formats, and operating systems constructed in accordance with the present invention may be embodied in a wide variety of different forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
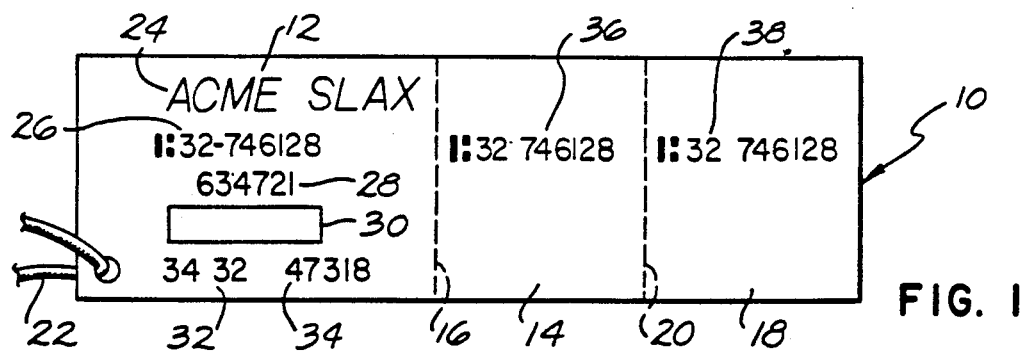
FIG. 1 is a top plan view of an authenticator tag in accordance with the present invention.

Referring initially to FIG. 1, a merchandise verification tag 10 is represented for use on a specific product or unit of merchandise. In various embodiments, the tag 10 may take the form of a label, product instructions, a certificate, a guarantee, or various other forms of documents associated with units of merchandise.

The tag 10, illustrated somewhat as a label, comprises a sheet of fiber paper having as a characteristic, an innate variable pattern of light transmissivity. The pattern is measurable. Such patterns may be observed in common ordinary bond paper by holding a sheet up to a light source and viewing the light source through the paper. The fact that such a pattern is inherent and random in the natural composition of the sheet, renders it substantially unduplicable as a characteristic for the tag 10.

The tag 10 is perforated to define three distinct sections. The major section 12 is separated from a section 14 by a line 16 of perforations, and somewhat similarly a section 18 is separated from the section 14 by a line 20 of perforations. The sections 14 and 18 are of similar size while the section 12 is somewhat larger and incorporates a cord 22 for direct attachment to a unit of merchandise.

The verification tag 10 carries several different items of specific information. Indicia 24 on the tag indicates a trade identity for the product. Normally, such indicia will be in a form readily perceivable to a prospective purchaser of the product.

Immediately below the indicia 24 on the section 12, there is machine-readable printing 26 in the form of a numerical representation, part of which is a batch-set designation, another part stating the specific identification of the tag. The number, e.g. "32-746128" serves as a unique address identification for use to designate a storage location or cell in memory (described below) where information is stored relevant to the product associated with the verification tag 10. Specifically with regard to the exemplary tag 10, the printing 26 manifests a numeral "32" which designates the product to be one unit in a particular batch set. Additionally, the printing designates a numeral "746128" which, within the batch set, identifies a specific unit of merchandise.

Below the printing 26 another row of numerals is provided by indicia 28 which is characteristic identification and relates to the verification of the tag 10. Indicia 28 specifies a characteristic identification of the tag 10, i.e. the transparency of the tag 10 at select spots in a specific area within a box 30. That is, the box 30 defines a fragment of section 12 of the tag 10, specific spot locations which have a characteristic, e.g. light transparency, which is specified directly or indirectly by the indicia 28.

The detailed operations of sensing the medium of the tag 10 within the box 30 to specify the unique characteristic, then comparing the observed data with the data represented by the indicia 28 is treated in considerable detail in the above-identified parent patent captioned "Non-Counterfeitable Document System".

Along the bottom of the verification tag 10 (below the box 30) there is size indicia 32 ("34W 32L") for the product and an identification indicia 34. The size indicia 32 indicates the size of the product, e.g. trousers, to which the verification tag will be attached and the identification indicia 34 indicates the so-called SKU data for the product (stock keeping unit) as widely used in the retail industry.

Considering the tag sections 14 and 18, each section carries indicia similar to the machine-readable printing 26. Specifically, section 14 carries machine-readable printing 36 and section 18 carries machine-readable printing 38. In general it has been found to be desirable to provide the printings 26, 36, and 38 in horizontal alignment on the tag 10 for standardization in batch processing.

To consider the use of the tag 10 somewhat preliminarily, assume that it is to be used on a pair of trousers of a specific size and style. That is, the tag 10 is produced for the specific unit of merchandise to which it is to be attached. In a sense, the tag 10 might be analogized to a "birth certificate" for a specific unit of merchandise.

In the exemplary system, the tag 10 is attached to its associated unit of merchandise by the cord 22. On completion of the unit of merchandise (not shown) with the tag 10 attached, section 18 of the tag might be removed and processed (as part of a set) to record the fact that the unit of merchandise exists in a finished form with tag affixed.

During normal distribution and marketing operations, the tag 10 will move (with its associated unit of merchandise) into various channels of commerce. For example, in due course, the unit of merchandise might be placed in inventory for a time, shipped to a distribution point, and then transported to a retail establishment. As a part of such operations, the tag may be sensed at different junctures. At one stage, section 14 may be removed for bulk processing as to record the fact that the unit of merchandise has been sold to a particular retail establishment. Accordingly, groups of the tags provide input data (on the basis of the machine-readable printing) concerning the history (status and location) of their associated individual units of merchandise. Set data is accordingly developed for convenient future selection of subsets of interest or concern.

To provide information on products at terminal or junction points along the commercial path to a consumer, the tag is machine read and data is recorded. In that regard, sections 14 and 18 of the tag can be removed for use in bulk processing operations, or a sensor wand as well known in the art can be used to sense the individual identification number and the batch-set number (printing 26). As individual product histories are developed, a record becomes available for sensing, as by use of set theory techniques, to detect and identify products that may be of concern and also to trace the history of specific products.

For specific product applications, tags in accordance herewith may incorporate varying numbers of removable sections (or none whatsoever) depending upon the nature of the merchandise and the related channels of commerce. Essentially, the advantage of removable sections is to accommodate high volume machine operations. Alternatively, as indicated, the product verification tag may be sensed or read by use of a hand-held wand as well known in the art of optical readers.

Devices as the tag 10 in cooperation with the methods and processing system of the present invention afford verification and flow information on individual units of merchandise associated with the tags. In general, the information is afforded by a technique of processing units of merchandise on a batch basis and treating the batch as a numerical set. By testing developed subsets of a batch set, desired data relating to merchandise of concern may be identified, verification being possible with access to the tags in question. It is important to appreciate that the numeral "32" in the machine-readable printing 26 identifies the batch of goods which constitutes an arithmetic set that includes the individual unit associated with the verification tag 10. That is, the system of the present invention involves a philosophy of operation in which units of merchandise are identified both individually and in batches or groups as specified sets and subsets to isolate useful data as the units move in the channels of commerce. Significantly, the system is capable of providing information on the products that are of concern, as distinct from the large volume of products that move properly as scheduled. Examples below will illustrate the subset selection operation with respect to certain market occurrences.

Assume, for example, that a batch of verification tags are to be provided to a manufacturing facility from a secure source where the tags are stored. There is always some danger that part of the batch will be diverted for use on counterfeit or unauthorized units of merchandise. In spite of the danger, normally in due course, most of the verification tags in the batch would be attached to individual units of merchandise. Treating such individual units as a subset, with the system hereof it is relatively simple to determine which if any of the tags were not attached to units of merchandise. The identification of the unused tags accommodates tracing and search operations. It may be important that the tags be of a non-counterfeitable configuration to assure that the data is reliable.

Considering another example, assume that some of a batch of goods are pilfered or lost. By using subset tests, the divergent goods may be positively identified. Goods that are diverted from the manufacturer's proper channels of distribution can also be identified. Additionally, any diverted units of merchandise (located outside proper distribution channels) may be verified and the source of such units determined.

Figure 2:
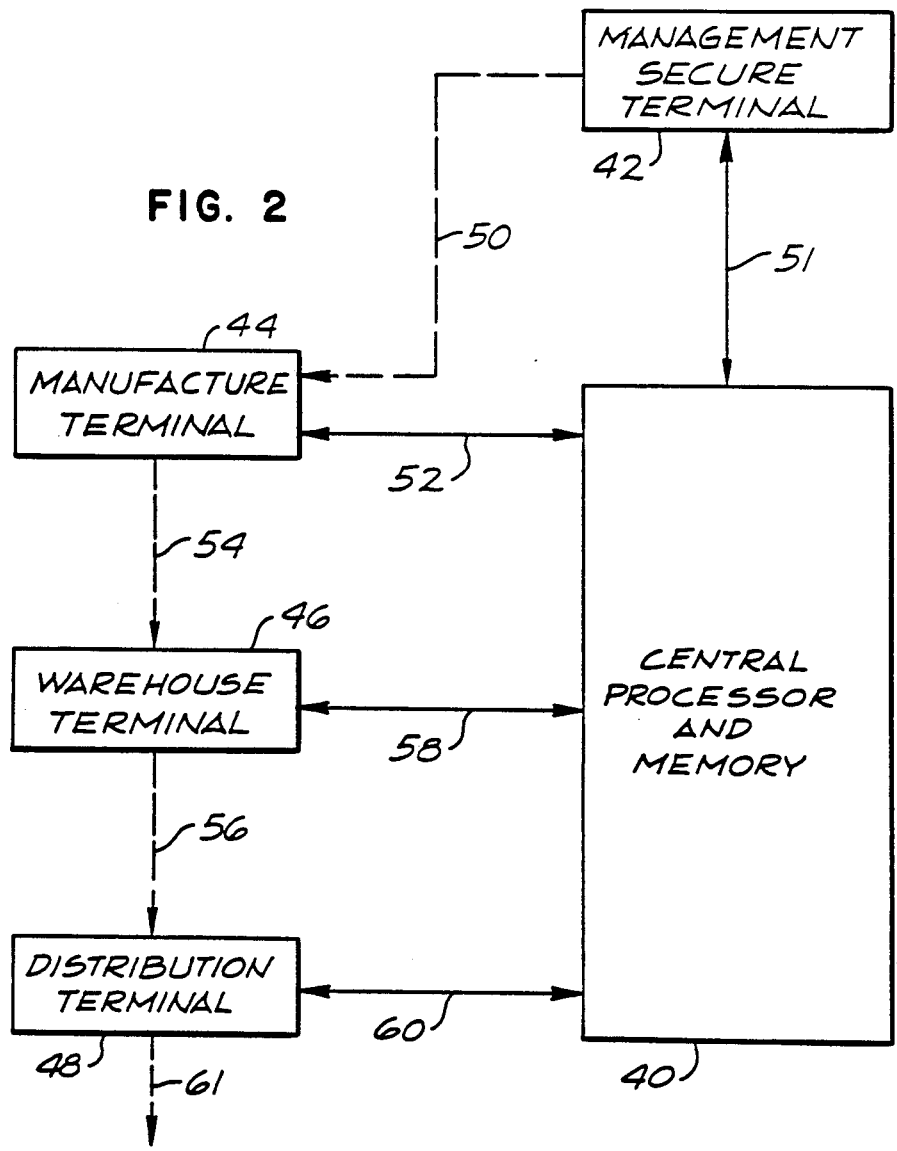
FIG. 2 is a block diagram of a system constructed in accordance with the present invention.

A system of the present invention utilizing the verification tag 10 is illustrated generally in FIG. 2. The system includes a central processor 40 with a plurality of terminals, some of which are at locations that are remote from the location of the processor and memory 40. A secure terminal 42 for management use may be conveniently located with respect to the central processor and memory 40. Generally, the terminal 42 can command all available operations by the processor 40. The other terminals in the system do not offer such unlimited access or control. Specifically, a limited-function terminal 44 is located at a manufacturing site, a similar terminal 46 is located at a warehouse site, and another such terminal 48 is located at a distribution center. Of course, in different embodiments of the present invention, the terminals may be variously located and disposed, depending upon the channels of commerce and the specific goods on which the tags are to be used.

In view of the above explanation and description, an understanding of the system of FIG. 2 may now best be accomplished by assuming a specific merchandising situation and explaining operations by the system of FIG. 2 utilizing the tag 10 (FIG. 1) as associated goods move through channels of commerce. Accordingly, assume initially that at the location of the management terminal 42, a batch of tags (exemplified by the tag 10, FIG. 1) are prepared for use with a batch of goods, specifically trousers.

Tags 10, defining a batch set "32" of identification numbers are sensed and prepared for subsequent verification as described in detail in the above-referenced parent patent, "Non-Counterfeitable Document System". Generally, the characteristic of each tag is sensed at select spots within the box 30. The resulting numerical values are encoded according to a format that may be specified for the batch. The resulting encoded values (e.g. 634721) are then printed on the tags along with the other indicia including the machine-readable printing 26.

Either as an independent operation or concurrently with the coding of the tags, the signal represented data from each tag is registered in the central processor and memory 40 through a communication channel 51. Specifically, the identification numbers (e.g. 32-746128), the SKU numbers (e.g. 47318), and the present state of the tags (being sent unattached to a specific manufacturing location) are registered as disclosed in detail below to initiate a historical record of each unit of merchandise associated with each tag.

Following the initial preparation and recording operations, the tags are transported as a batch to a specific manufacturing site, in the disclosed embodiment the site of the terminal 44. Note that the movement of the tags from the location of the management terminal 42 to the location of the manufacture terminal 44 is indicated by a dashed line 50.

The manufacture terminal 44 essentially has the capability to record the next step for commercial production in the processor and memory 40. Specifically, when the assumed batch of tags (exemplified by tag 10, FIG. 1) have been attached individually to units of finished merchandise, e.g. trousers, that occurrence is recorded. The actual recording is performed when section 18 (FIG. 1) of the attached tags is removed and physically supplied to the terminal 44. The terminal processes the tag sections, e.g. section 18, to produce signals representative of the machine-readable printing which indicate the batch set number "32" and the unit identification number, for example "746128". The signals representative of the information are transmitted via the channel 52 to the central processor and memory 40. The records of each unit in the batch set are thus updated by a status change to indicate that the tags are attached to units of merchandise. The terminal 44 also may be actuated to indicate the shipment of specific items of merchandise to specific warehouses for recording in the cells of memory 40.

Considering the specific operations, the information developed at the terminal 44 by machine reading the sections 18 and by supplemental input (as a keyboard) data is supplied to the central processor 40 through a communication path 52 and the record on the exemplary batch set is enhanced. The batch set may now comprise a plurality of separate subsets. For example, less than all of the batch of the tags might have been attached to units of merchandise. Also, the tags of a batch set may be on goods that are shipped to different warehouses. In any event, the central processor 40 (FIG. 2) registers such facts to distinguish subsets of the batch set.

Units of merchandise shipped from the location of the terminal 44 to the warehouse location of the terminal 46 is indicated by the dashed line 54. As suggested, other destinations might also be involved; however, at the terminal 46, an operation similar to that described above occurs when the units of merchandise are again moved as indicated by the dashed line 56. Specifically, the set may be further divided, the data on individual units reflecting such divisions being transmitted by the terminal 46 through the channel 58 to be recorded in individual cells (or the equivalent) by the processor and memory 40.

The original batch set may be further divided at the distribution terminal 48 where appropriate data is transmitted by the terminal 48 through the channel 60 to the memory 40. The related movement of the units of merchandise is indicated by the dashed lines 61, an event which is also recorded in the memory 40.

With each significant movement of the units of merchandise, the machine-readable numerical designation is sensed to provide input signals to the central processor and memory 40 which enables tracing of individual units of merchandise based on numerical set analysis. In using the label tag 10 to reduce data to signals, tag sections 14 and 18 may be removed for batch processing by an optical code reader. Consequently, the sections can be transported to a terminal location for access to the central processor 40. Using an alternative approach, as indicated above, the machine-readable numerical designations on the tag 10 may be sensed by a hand-held wand with the tags in place, attached to individual units of merchandise.

As the units of merchandise flow into channels of commerce, the management secure terminal 42 may be employed to test the contents of the central processor 40 (and associated memory) to indicate that either tags or merchandise have gone astray. It is important to appreciate that the machine-readable numerical designations indicate a designated batch and an individual item. By utilization of the combination information with the ability to define subsets, the system is effective for providing detailed information for tracing goods, particularly goods that have gone astray. A variety of arithmetic set operations are described below with reference to the more detailed system representation of FIG. 3, for identifying units of merchandise that have moved out of proper marketing channels. History information on select units of merchandise is also available. For example, the distribution terminal 48 may provide an identification number to the processor and memory 40 for a rundown on a specific unit of merchandise.

FIG. 3 illustrates the system of FIG. 2 in somewhat greater detail and will now be described with regard to detailed operations. However, in FIG. 3 only two terminals are represented, i.e. a location terminal 62 representative of remote terminals, e.g. terminals 44, 46, and 48, and a management terminal 64. The remote location terminal 62 typifies a possible variety of such terminals while the management terminal 64 represents a comprehensive computer interface in relation to the central processor.

The terminals 62 and 64 are connected to a terminal controller 66 which is in turn connected to a central processor controller 68 that is associated with an address register 70 and a memory 72.

The memory 72 is organized to register a large number of information items each being associated with a particular item of merchandise. Considering the exemplary tag 10 (FIG. 1) a cell in the memory 72 is provided for information on the tag 10 where data may take a format as represented in FIG. 4. Of course, a wide variety of different data registration techniques and schemes may be employed as well as a multitude of addressing and search techniques. However, in essence, the memory 72 (FIG. 3) registers information on units of merchandise designated individually and in batch sets with information indicative of the history of such units of merchandise.

In the described embodiment, individual data locations are specified by the identification number, e.g. "32-746128" which can form an address for the memory 72 either for all units in a batch or for any individual unit. That is, the identification number is in a one-to-one arithmetic correspondence with the machine address. Of course, a wide variety of addressing and search schemes are presently in use and can be variously implemented. Likely, additional schemes will evolve in the future. The important consideration resides in the fact that the identification number (printing 26) associated with the tag 10 (FIG. 1) may be specified to the memory 72 (FIG. 3) to place a value in the address register 70 which will access the memory 72 specifying a data cell or a group of cells as illustrated in FIG. 4.

As illustrated in FIG. 4, an initial data section 80 of the memory cell contains representations of the identification (batch number "32" and unit number "746128") which is the machine-readable printing 26 (FIG. 1). Note that this data is a repetition, in that the identification confirms the address.

The next section 86 of the memory cell (FIG. 4) contains the SKU number, e.g. "47316", providing further identification data. The following section 88 registers a number manifesting the last reported status or state of the associated unit of merchandise. Of course, a number of states may be assigned; however, examples simply include possible situations for units of merchandise associated with the tag 10. In the illustrative embodiment, the following state codes are applicable:

| STATE CODES | DESCRIPTION |
| --- | --- |
| 1 | Tags completed and printed but not attached to merchandise |

| STATE CODES | DESCRIPTION |
|---|---|
| 2 | Tags attached to merchandise and released from factory |
| 3 | Tags on merchandise sold to customers |

Somewhat associated with the state of an item of merchandise are the location codes registered in sequence as a history for the movements of each unit of merchandise. A code in section 90 contains information indicating the time and manufacture location of the associated merchandise. For example, the numerals "3648" are coded to indicate the year, month, and a specific factory. The next illustrated sections in the sequence record various data specific to individual units of merchandise. In that regard the batch set may be divided further into subsets. Section 92 records the identification of a warehouse, section 94 indicates a date of sale and a customer.

Following the historical record sections, e.g. sections 90, 92, and 94, a section 95 records the characteristic verification number for the tag 10. That designation can confirm the authenticity of a tag associated with a unit of merchandise.

Note that the memory sections 80, 86, 88, 90, and 95 are loaded at the time when the tag 10 is initially processed. Thereafter, the history sections receive other data to record the movements of the associated unit of merchandise and formulate subset criteria for tracing and auditing operations. For example, the number "72" indicates a specific warehouse while the number of "4105793" indicates a sales date and a specific retail organization.

The central processor 68 (FIG. 3) in the system for controlling operations may comprise any of a variety of machine processors capable of controlling the flow of data with respect to the memory 72 and performing certain logic operations. The logic operations for the controller 68 may vary considerably; however, exemplary operations are set forth below:

| | OPERATION CODE CHART | |
|---|---|---|
| Code | Description | Logic |
| 1 | Identify a specific unit | Read data cell contents |
| 2 | Identify all units in a specified state | Test states and read selected cells |
| 3 | Identify all units in a specified state and batch | Test states and batches and read selected cells |
| 4 | Identify all units in a specified state and not in a specified set or subset | Test states and sets or subsets and read selected cells |
| 5 | Identify all units of a specified batch at specified warehouse location | Test batches and locations and read selected cells |
| 6 | Identify all units of a specific batch sold to a specific customer after a specified date | Test batches, customers, and dates and read selected cells |
| 7 | Identify all units from a specific manufacturing location sold to a specific customer after a specified date | Test manufacturing location, customer, and dates and read selected cells |
| . | | |
| . | | |
| . | | |
| N | Clear all units in a specified batch | Test batches and clear selected cells |

Note that in the system of FIG. 3, the central processor 68 may comprise any of a variety of available computers programmed as well known in the prior art to perform sorting, batching, and selection operations.

In general with respect to the logic operations in the central processor 68, the tests of routine checking will involve identifying a specific number or a subset of identification numbers associated with merchandise that has become of interest or should be of interest. For example, a test for tags of a specific batch set that have not been attached to merchandise may identify verification tags that have gone astray and may well be expected to appear on conterfeit merchandise. Other tests for identifying other problematic merchandise identifications will be readily apparent to those skilled in the art of marketing and distribution.

In view of the above description of an illustrative embodiment of the system, further details and the operation thereof may now be best understood by considering an exemplary merchandising operation concurrently with the introduction of other system components. Accordingly, assume initially the need for a batch of tags as exemplified by the tag 10 (FIG. 1). The tags might be partially completed in a "raw" form as a result of bulk operations that would include cutting the tags and printing the record data, i.e. the indicia 24 (trade identification), machine-readable printing 26 (identification number), the box 30, the size indicia 32, and the SKU indicia 34. Completion of the tags involves characteristic verification coding to formulate signals representative of a characteristic of each individual tag and to print the representative indicia 28.

Specifically, the "raw" tags would be completed at the management terminal 64. The processing includes a number of specific operations with the terminal 64 coupled through an interface unit 95 to the central processor 68 via the terminal controller 66. Such operations are to be performed in a high-speed batch process, however, consider the events with respect to a single tag. Control is provided by an input device 100 and monitoring data is provided by an output device 101. The input and output devices 100 and 101 are coupled to the interface unit 95 as well as a sensor 96, a printer 98, and a reader 102.

A label reader 102 reads the machine-readable printing 26 from the tag. The sensed tag I.D. number may be printed on a list by the output device 101 if hard copy is desired. The output device may include a display as well as a printer.

Somewhat concurrently with the operation of the reader 102 sensing the identification number (printing 26) the verification sensor 96 senses the light transparency of the tag 10 at pre-programmed locations in the box 30 (FIG. 1). The resulting signals (FIG. 3) drive the printer 98 (through the interface unit 95) to accomplish the characteristic verification indicia 28. Signals representative of the identification number are sent to the central processor and controller 68 for registration.

Upon receiving signals representative of the identification number (the machine-readable printing 26) the central processor controller 68 accesses a cell in the memory 72 specified by the identification number "32-746128" using the address register 70. The same identification number "32-746128" is then registered in the designated section or cell of the memory, see FIG. 4.

The input device 100 is used to set up the central processor and controller 68 to provide signals for registering additional data in the addressed cell of the memory 72. Specifically, signals representative of the SKU number ("47316"), the initial state of the tag ("1"), and the initial destination of the tag ("3648", indicating a date and specific manufacturing location) are provided from operating memory to be registered in the addressed cell along with the verification data "634721".

Detailed structures and methods for sensing the verification data are disclosed in the referenced parent patent: "Non-Counterfeitable Document System". That is, the representative verification signals are supplied to the printer 98 which prints the individual indicia 28 on each tag, e.g. tag 10. Also, the sensed data is supplied from the verification sensor 96 through the interface unit 95 and the terminal controller for registration in section 95 (FIG. 4) of the specified cell in memory 72, e.g. as the number "634721". Thus, tags, e.g. tag 10, are prepared, complete with initial records, as a group which constitutes a batch designated as batch "32", however, each unit being individually identifiable.

The act of transmitting the exemplary batch of tags to a manufacturing facility may serve as authority for the production of units of merchandise specified by the tags. Alternatively, various confirmatory or authorization techniques might be employed to order production of merchandise units for the individual tags.

With each of the tags transferred to a manufacturing location on a specific month (combination designation "3648") the history or "life" of a group of individual products is initiated. Soon after production, or even as a step in the production of specific units of merchandise, individual tags, as exemplified by tag 10, are attached to each unit of associated merchandise. Specifically, the tag 10 is attached to a pair of trousers, size "34L 32W", SKU number "47318". That unit of merchandise accordingly can be confirmed as a genuine article by the affixed verifiable tag 10. Furthermore, in accordance herewith that unit can be identified for tracing or auditing operations.

Continuing with the exemplary sequence of events, assume that the goods are next prepared to be shipped to a warehouse. As a part of that procedure, sections (e.g. section 18 FIG. 1) are removed from the tags (affixed to merchandise) for bulk processing at a terminal, e.g. the terminal 62, FIG. 3. The tag sections, exemplified by the section 18 are fed to a bulk label reader 106 which senses the machine-readable printing in the form of the identification number "32-746128". Prior to communicating the identification numbers to the controller 68, a keyboard 108 is actuated to establish communication through an interface unit 109 and the terminal controller 66 to the controller 68. The keyboard is actuated to instruct the controller 68 to register additional information on each of the identified units. Specifically, the status code is changed from "1" (designating unattached tags) to "2" designating attached tags. Furthermore, the warehouse destination for the goods is indicated to be recorded in section 92 (FIG. 4).

Accordingly, after the preliminary communication steps between the terminal 62 and the central processor controller 68, a group of tags, as tag 10, are batch processed to provide signals representative of the machine-readable printing 26 (tag 10, FIG. 1). Those signals serve to address cells in the memory 72 (FIG. 3) which are accessed to alter the registered state (section 88 FIG. 4) and supplement the historical record of the merchandise (register warehouse "72" in section 92).

It should be recognized that the batch of designated units may be sent to different warehouses. That fact will be registered by the coded designations of the different warehouses and registered in section 92 of the memory cell. In that regard, subsets of the batch set are defined.

Continuing with the assumed example, as indicated above, the goods or merchandise may be shipped from the warehouse (e.g. the warehouse designated "72" FIG. 4) to a variety of different distribution terminals. On that occasion, the identification numbers may be sensed by using a hand-held wand in association with a reader, as the reader 106, to scan the machine-readable printing 26 (FIG. 1). The sensed information (I.D. numbers) may then be used to locate data cells in the memory 72 (FIG. 3) for the recording of additional information. Specifically, distribution centers may be recorded for each item of merchandise.

Tracing a pattern of movement for the goods, in due course they will be shipped to a retailer. At that stage, title to the merchandise will likely pass with the consequence that another status change is appropriate. The date is significant along with the identification of the recipient (or recipients) of the merchandise. Accordingly, using the terminal in the proximity of the distribution location (exemplified again as the terminal 62), the appropriate instructions are issued and data from the tags is batch processed. Thus, as described above, cells in the memory 72 are revised and updated. Status "3" may be entered in memory sections 88 to indicate the merchandise has been sold and the "date-recipient" and "date" code "4105793" may be entered in the section 94.

As the historical record is developed, a basis is provided for tracing the merchandise and testing for merchandise or tags that may strayed from the proper channels of commerce. Many tests using set classifications to isolate problem situations will be apparent to persons with marketing expertise. However, some exemplary tests will now be explained, as facilitated at the management terminal 64, using the input device 100 and the output device 101.

At a time when most tags in a batch should have been attached to goods, a simple test for a subset of tags in the batch which have not been attached to units of merchandise is informative. A test for all tags of batch "32" that are still in state code "1" would identify a subset of specific tags that may suggest a problem. Accordingly, further investigation likely would be appropriate, as the identified tags may have been lost or stolen. If appropriate, the specific identification numbers of such labels can be listed as possible counterfeit merchandise or other action can be taken.

Set tests for identifying tags of merchandise also can be important to locate lost or stolen merchandise. For example, a test of operation code "4" could identify any specific units of merchandise of the batch set "32" that had not been sold as indicated by state code "3". After all units in a batch normally would have been expected to have been sold, the test for any remaining units could be informative as to stolen merchandise.

Another test to indicate goods of interest might be used in the event that a purchaser claimed a short delivery. Specifically, according to an operation code "7" a search could be made to identify the subset of units sold to the purchaser after a specific time. Such a list would enable an inventory check with the objective of identifying missing goods as stolen. The verifiable identification numbers of such missing goods would provide a meaningful basis for checking into the situation.

In the event that stolen or diverted goods are found, the individual units of merchandise can be traced from the history recorded in the memory 72. For example, a unit of stolen merchandise can be tested at the terminal 64. The label reader 102 senses the identification number of the unit and the verification sensor 96 senses the inherent characteristic for verifying that the tag is genuine. The input device 100 is used to command an inquiry and as a consequence, the identified cell in the memory 72 provides signals to the output device 101 to manifest the cell contents as illustrated in FIG. 4. Consequently, the history of the merchandise unit is provided affording data to determine the last location and status of the unit before going astray. With such information further investigation may well determine the source of a problem that can be corrected.

Persons skilled in specific marketing operations will promptly recognize that by the performance of various set logic tests involving relationships between recorded status data, location information, identification numbers, and batches, considerable information may be obtained at various stages on isolated units of merchandise to combat common problems in that regard. As another example, one might check units of a set that were reportedly sent to a particular group of warehouses or customers. Culpable parties in a chain of transactions may be identified.

Figure 5:
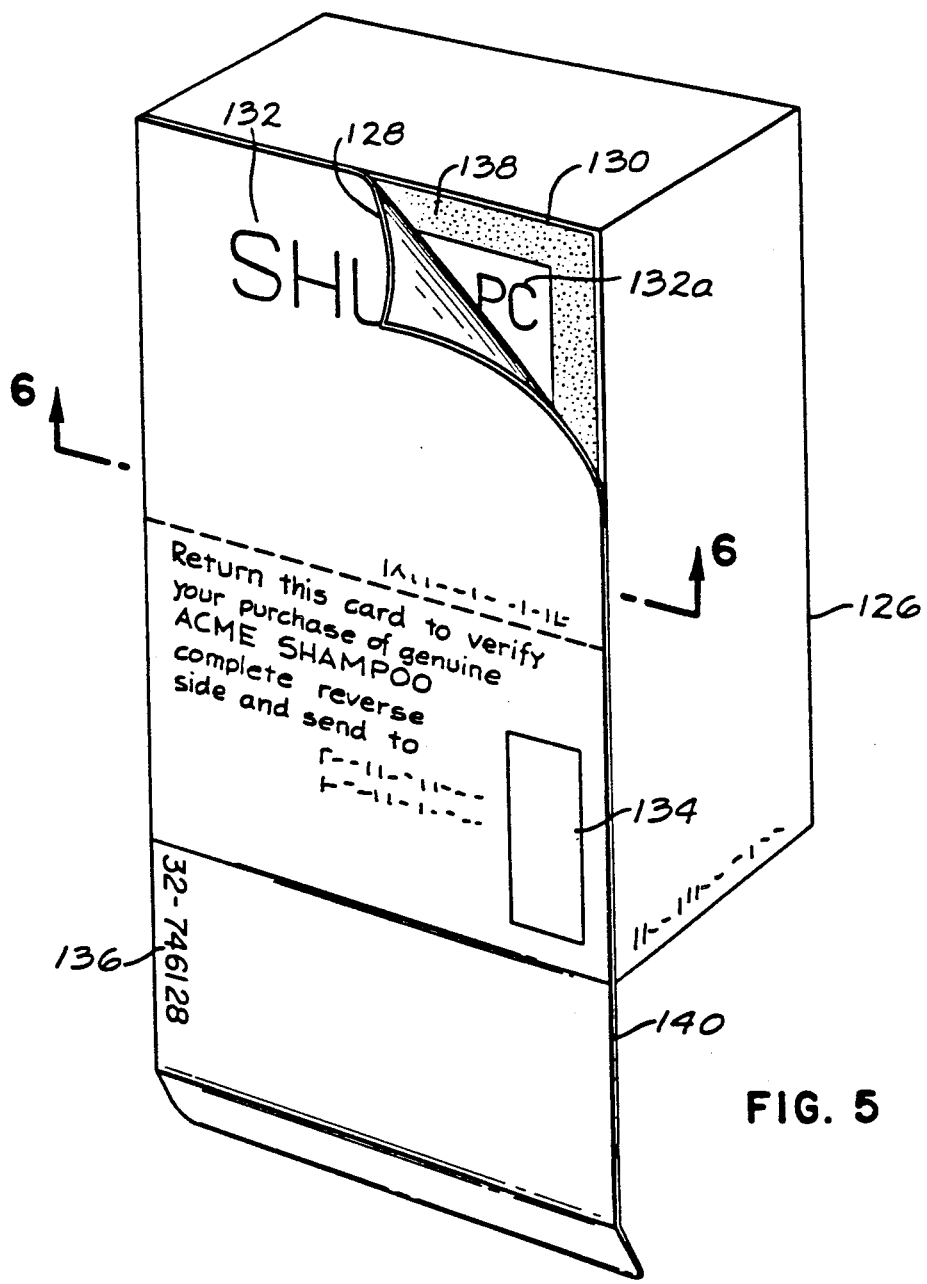
FIG. 5 is an isometric view of a package incorporating an authenticator tag in accordance with the present invention.
Figure 6:
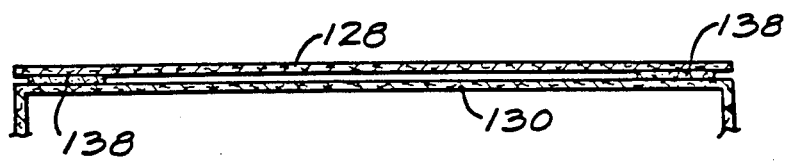
FIG. 6 is a sectional view taken along line 6—6 of FIG. 5.

As suggested above, tags may take various forms. An alternative structural tag form is illustrated in FIGS. 5 and 6. Specifically, a merchandise container or box 126 is provided with a releasable tag overlay 128 on a folded panel 130 of the box 126. The overlay 128 comprises a natural fiber material, specifically paper.

Considering the structure in greater detail, the tag overlay 128 is provided with artwork including trade identification printing 132, a characteristic-locating rectangle 134, and identification number indicia 136 which is in machine-readable form. A return instruction 137 is also provided on the overlay 128, specifically: "Return this card to verify your purchase".

The overlay 128 coincides to the panel 130 in area, folds, and major artwork. Including folded sections in the overlay 128 can make it more difficult to remove the overlay without leaving traces of such removal.

The overlay 128 is releasably bonded to the panel 130 by a layer 138 of adhesive as illustrated in FIG. 6. The layer 138 is releasable with respect to the clean removal of the overlay 128. Normally, such removal will involve opening a flap of the mated overlay 128 and panel 130 to the illustrated position of FIG. 5. The overlay 128 can then be easily removed as illustrated at the upper right corner, with the adhesive layer 138 remaining on the panel 130. Note that the panel 130 has artwork similar to that of the overlay 128, as shown by printing 132a.

Once removed from the box 126, the tag overlay 128 is in the form of a flat sheet and can be batch processed as one of a large group. In some situations it may be desirable to use an area of the overlay 128 for the characteristic verification data, while in other situations it may be desirable to use an area of the box 126. Individual situations will resolve such details. In that regard, in addition to specifying subsets on the basis of select batch identification or historical data, it is important to afford operations that can verify the authenticity of individual devices in the form of labels, boxes, or packages. That is, if the identification devices are susceptible to easy counterfeiting, then the operations as described above with respect to monitoring may be cast in doubt as far as reliability is concerned.

The invitation legend or instruction 137 is effective to verify authenticity, and is particularly useful in conjunction with units of merchandise that are frequently counterfeited. Frequently, a purchaser may suspect that merchandise purchased is not genuine in view of the circumstances of the sale. In such a situation, the purchaser may very well return part or all of the overlay 128, if only to satisfy curiosity. Testing the authenticity of such returned overlays in the present system can be very informative. If the overlay is not genuine, a counterfeit is known and corrective steps can be pursued. If the overlay is authentic, the history of the product may be in relation to other possibilities as considered above.

From the above detailed description it may be seen that the system of the present invention affords an effective means for combatting counterfeit operations as well as other techniques involving the diversion or substitution of trade-identified merchandise. Recognizing the significance of certain key aspects of the system, it is to be understood that a wide variety of techniques and apparatus may be employed depending upon the objectives involved, the nature of the goods in commerce and the channels of commerce for such goods. Consequently, the scope hereof is deemed to be appropriately determined by the claims as set forth below.

What is claimed is:

1. A machine verification device for use with a specific unit of merchandise, comprising:
   a verification tag comprising a medium having a measurable anticounterfeit characteristic;
   identification indicia on said tag designating said specific unit of merchandise;
   verification indicia on said tag for use to authenticate said anticounterfeit characteristic; and
   means for affixing said vertification tag to said specific unit of merchandise whereby said identification indicia is accessible for sensing or observing.

2. A verification device according to claim 1 wherein said identification indicia uniquely identifies said tag as a unique unit in a unique set.

3. A verification device according to claim 1 wherein said identification indicia includes a plurality of print font forms.

4. A verification device according to claim 1 wherein said anticounterfeit characteristic comprises a light sensible structure.

5. A method of auditing the commercial history of individual units of merchandise, coprising the steps of:
   providing sheets of medium having an anticounterfeit characteristic;
   sensing said characteristic of said sheets to determine authenticity;
   assiging identification data to said individual sheets of medium;
   imprinting said sheets of medium with indicia representative of said identification data;
   affixing said sheets to said individual units of merchandise;

registering at least one status of said units of merchandise in a record storage using said identification data; and tracing said units of merchandise by verifying said anticounterfeit characteristic and indexing said record storage with said identification data.

6. A method according to claim 5 wherein asid sensing includes light sensing.

7. A merchandise verification and information system for use with identification devices, each of said devices being associated with a specific unit of merchandise for commerce and comprising a medium having a sensible anticounterfeit characteristic, said devices bearing indicia identifying said specific unit of merchandise, said system comprising:

means for sensing said sensible anticounterfeit characteristic of said devices to determine authenticity;

means for printing indicia on said devices representative of a specific unit of merchandise;

a central processor apparatus including a memory means comprising cells to register data on each of said specific units of merchandise;

means for entering data in a cell on said specific unit of merchandise as manifest by said indicia, including data identifying the specific unit of merchandise; and means to enter status data in a cell identified by data identifying a specific unit of merchandise representative of at least one status of said specific unit to provide a record of at least one specific location in commerce of said specific unit in said central processor.

8. A system according to claim 7 wherein said devices further carry indicia representative of a set of units of merchandise to which a speicific unit of merchandise belongs, said system further including means for enetering data in a cell of a specific unit relating to said set;

means for addressing said central processor memory means with logic combinations of a specific set of units and a specific unit whereby to isolate select cells of said memory; and means to manifest the content of said select cells.

9. A machine vertification device for use with a specific unit of merchandise, comprising:

a verification tag having an anticounterfeit characteristic;

identification indicia on said tag in a plurality of print font forms;

verification indicia on said tag for use to authenticate said anticounterfeit characteristic; and means for affixing said vertification tag to said specific unit of merchandise whereby said identification indicia is acccessible for sensing or observing.

10. A verification device according to claim 9 further including a section bearing said identification indicia and fixed to said tag for removal along a defined line.

11. A verification device according to claim 9 wherein said identification indicia includes trade identity indicia.

12. A verification device for use with a specific unit of merchandise, comprising:

a verification tag comprising a medium having a sensible anticounterfeit characteristic;

identification indicia on said tag including a batch set designation and a tag designation; and means for affixing said verification tag to said specific unit of merchandise whereby said identification indicia is accessible for sensing or observing.

13. A verification device according to claim 12 further including an SKU indicia.

14. A verification device according to claim 12 wherein indicia is presented in plural print font formats.

* * * * *